United States Patent [19]

Dubost et al.

[11] Patent Number: 4,566,361
[45] Date of Patent: Jan. 28, 1986

[54] APPARATUS FOR SHEARING IRRADIATED FUEL ASSEMBLIES

[75] Inventors: René Dubost, Saint Gervois; Robert Fiori, Connaux; Philippe Seyfried, Bagnols sur Ceze, all of France

[73] Assignee: Commissariat a l'Energie Atomique, Paris, France

[21] Appl. No.: 494,932

[22] Filed: May 16, 1983

[30] Foreign Application Priority Data

May 18, 1982 [FR] France ................... 82 08701

[51] Int. Cl.$^4$ .................. B23D 23/00; B26D 7/02
[52] U.S. Cl. ...................... 83/454; 83/563; 83/694; 83/925 R; 83/698; 29/400 N
[58] Field of Search .............. 83/694, 165, 168, 198, 83/454, 925 R, 698, 563; 29/400 N; 376/261; 252/627, 636

[56] References Cited

U.S. PATENT DOCUMENTS

| | | | |
|---|---|---|---|
| 3,610,083 | 10/1971 | Yasuda | 83/390 |
| 3,722,338 | 3/1973 | Cherel | 83/390 |
| 3,807,018 | 4/1974 | Ehrman et al. | 29/400 N |
| 3,827,579 | 8/1964 | Kendall | |
| 4,091,699 | 5/1978 | Chaze | 83/925 R |
| 4,245,532 | 1/1981 | Astill | 83/925 R |

FOREIGN PATENT DOCUMENTS

| | | |
|---|---|---|
| 2456169 | 11/1974 | Fed. Rep. of Germany. |
| 1587331 | 3/1970 | France. |
| 2034223 | 12/1970 | France. |
| 2117928 | 7/1972 | France. |
| 2271040 | 12/1975 | France. |
| 2336206 | 7/1977 | France. |
| WO78/00024 | 5/1979 | PCT Int'l Appl. |
| WO81/00687 | 3/1981 | PCT Int'l Appl. .................. 83/390 |

*Primary Examiner*—James M. Meister
*Assistant Examiner*—John L. Knoble

[57] ABSTRACT

Apparatus for shearing irradiated fuel assemblies, wherein a counterblade is mounted on a counterblade carriage, which normally bears against a detachable member, the counterblade carriage, a side-clamping carriage and a blade holder carriage being arranged on rails disposed in a direction perpendicular to the counterblade, a confinement cell communicating with an intervention cell by a passage normally sealed by a cover, the rails being extended in said intervention cell by said passage, whose dimensions make it possible for the carriages to travel in the intervention cell when the detachable member and the cover are removed.

4 Claims, 3 Drawing Figures

APPARATUS FOR SHEARING IRRADIATED FUEL ASSEMBLIES

BACKGROUND OF THE INVENTION

The present invention relates to an apparatus for shearing possibly contaminated tubular members, whereby they are cut into sections of limited length.

In per se known manner, shearing means generally comprise a confinement cell, in which is arranged a chassis supporting at least one fixed counterblade, at least one side-clamping carriage able to engage an assembly to be sheared with the counterblade and at least one blade holder carriage able to move in a direction perpendicular to the counterblade in order to shear said assembly.

These shearing means require relatively frequent operational interventions, in particular for replacing worn parts, such as the blade and counterblade. Moreover, these interventions have to be carried out whilst preserving the confinement and whilst preventing to the maximum possible extent any dispersion of the contamination.

In the hitherto existing shearing means, any operational intervention requires the disassembly of a cover covering the upper ends of the chassis, in order to give access to worn parts and particular the blade and counterblade. The intervention time is particularly long, because these operations have to be carried out remotely, e.g. using manipulators. This long operational intervention time is all the more prejudicial in view of the fact that the shearing means generally constitute one of the stations of an irradiated fuel processing line and the complete line then has to be stopped.

Moreover, these operational interventions involve the dismantling of the cover, which normally tightly seals the chassis. This has the effect of contaminating the complete confinement enclosure and all the equipment contained therein, which is obviously undesirable.

BRIEF SUMMARY OF THE INVENTION

The present invention relates to a shearing apparatus, which does not suffer from the disadvantages of the prior art apparatuses and which in particular permits a significantly reduced intervention time when a worn part, such as the blade or counterblade has to be replaced, together with a reduction in the dispersion of the contamination.

The present invention therefore specifically relates to an apparatus for shearing irradiated fuel assemblies of the type defined hereinbefore, wherein the counterblade is mounted on a counterblade carriage, which normally bears against a detachable member, the counterblade carriage, the side-clamping carriage and the blade holder carriage being arranged on rails disposed in a direction perpendicular to the counterblade, the confinement cell communicating with an intervention cell by a passage normally sealed by a cover, the rails being extended in said intervention cell by said passage, whose dimensions make it possible for the carriages to travel in the intervention cell when the detachable member and the cover are removed.

As a result of these features, it is readily apparent that, by remotely controlling the displacements of the detachable member and the cover, it is possible to move the carriages, whose worn parts have to be replaced in the intervention cell provided for this purpose. No dismantling is necessary, the operation taking place with a considerable time saving compared with the prior art shearing means. Moreover, they do not lead to any dispersion of the contamination in the confinement enclosure, whose equipment consequently remains protected. Finally, in view of the fact that the carriages carrying the blade and the counterblade are placed on fixed rails, they are precisely positioned relative to one another, which was not possible with the prior art means.

Apart from the operational interventions, which obviously occur most frequently, it can also be necessary to remove all the parts contained in the chassis therefrom, e.g. when the rails are damaged. For this purpose, the upper end of the chassis is preferably closed by a detachable cover within the confinement cell and carrying part of the rails. However, it should be noted that this emergency intervention requiring the removal of the complete assembly via the top only takes place in very exceptional circumstances. The most frequently encountered operational interventions take place, in the manner described hereinbefore, via the intervention enclosure provided for this purpose in accordance with the present invention.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
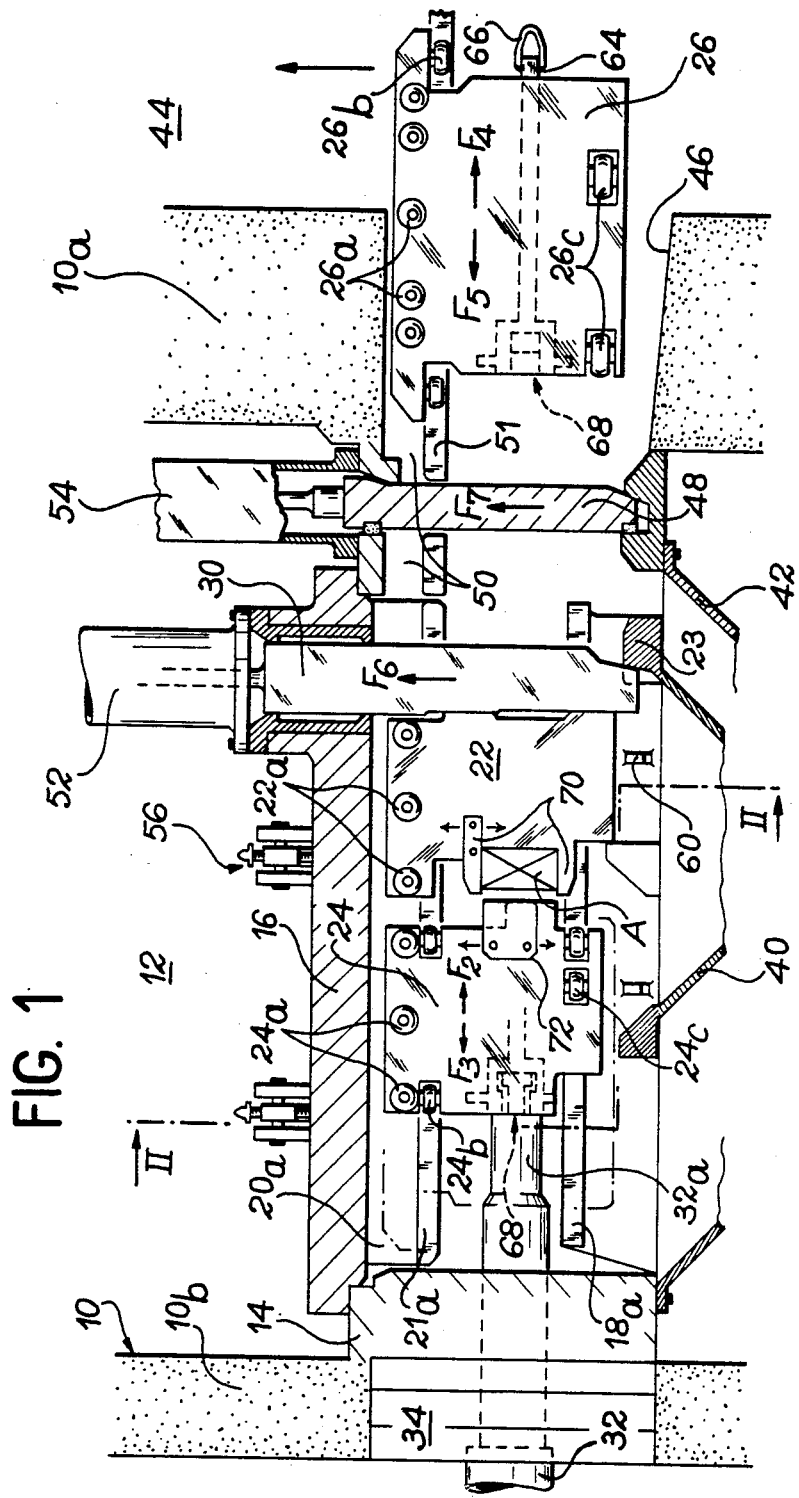
FIG. 1 a side view in diagrammatic sectional form of an apparatus for shearing irradiated fuel assemblies according to the invention.

The shearing apparatus shown in the drawing comprises a confinement enclosure 10 defining a shearing cell 12, in which is arranged a chassis 14, supporting the various members of the machine. Chassis 14 extends between a front partition 10a and a rear partition 10b of enclosure 10 and its upper end is tightly closed by a cover 16, subdividing cell 12 into a highly contaminated area below cover 16 and in which the various operations on assemblies A take place, and a slightly contaminated area above the cover 16 and which can contain the various, not shown equipments.

Chassis 14 has two lateral partitions which define between them a horizontal passage 17 (FIG. 2) extending from the front partition 10a to the rear partition 10b. In per se known manner, this passage contains a fixed counterblade 28 (FIG. 3), a side-clamping carriage 24 able to apply the assembly A to be sheared to the counterblade, and a blade holder carriage 26 supporting a blade 36.

Figure 2:
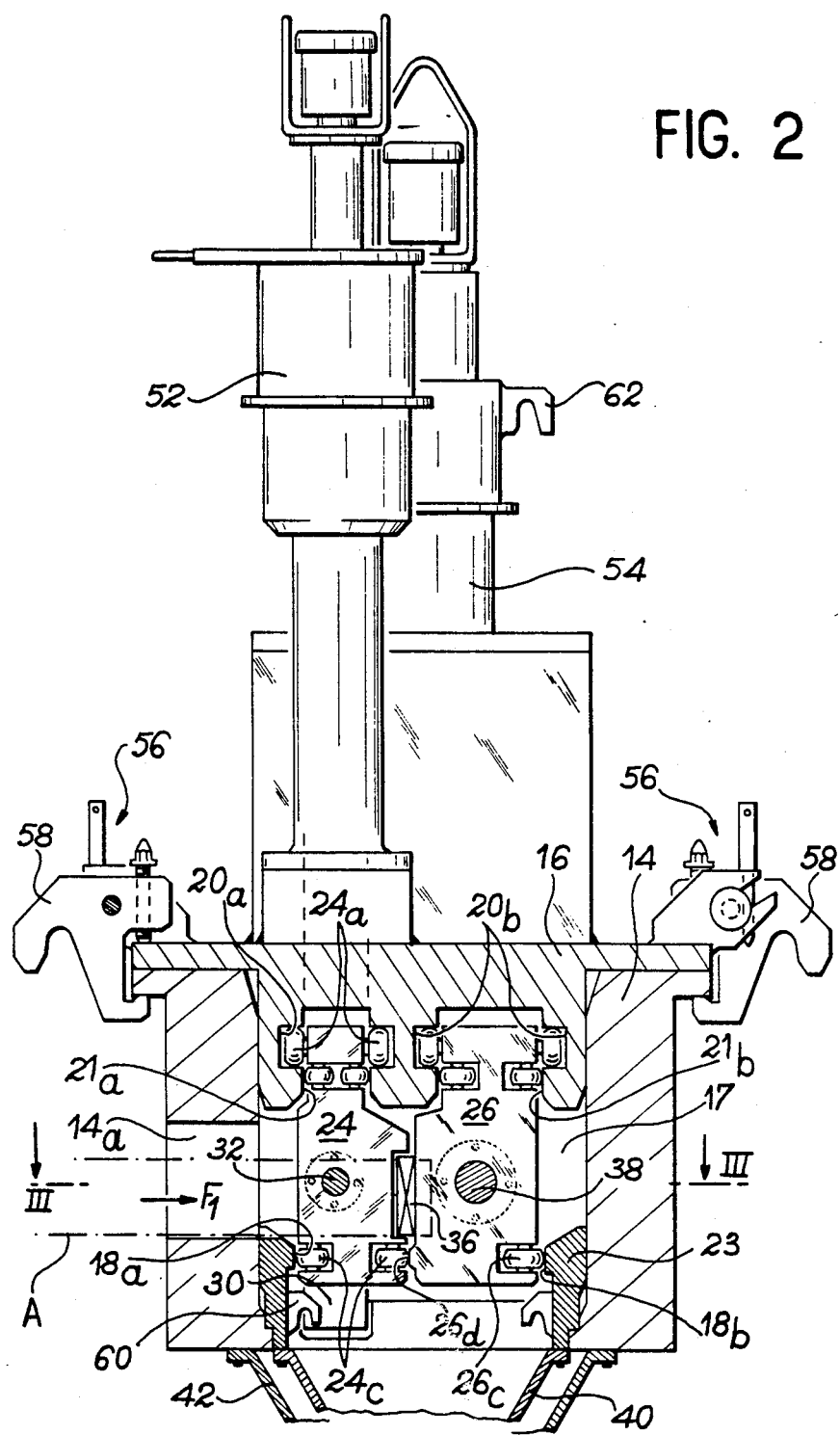
FIG. 2 an end view, in section along line II—II of FIG. 1.
Figure 3:
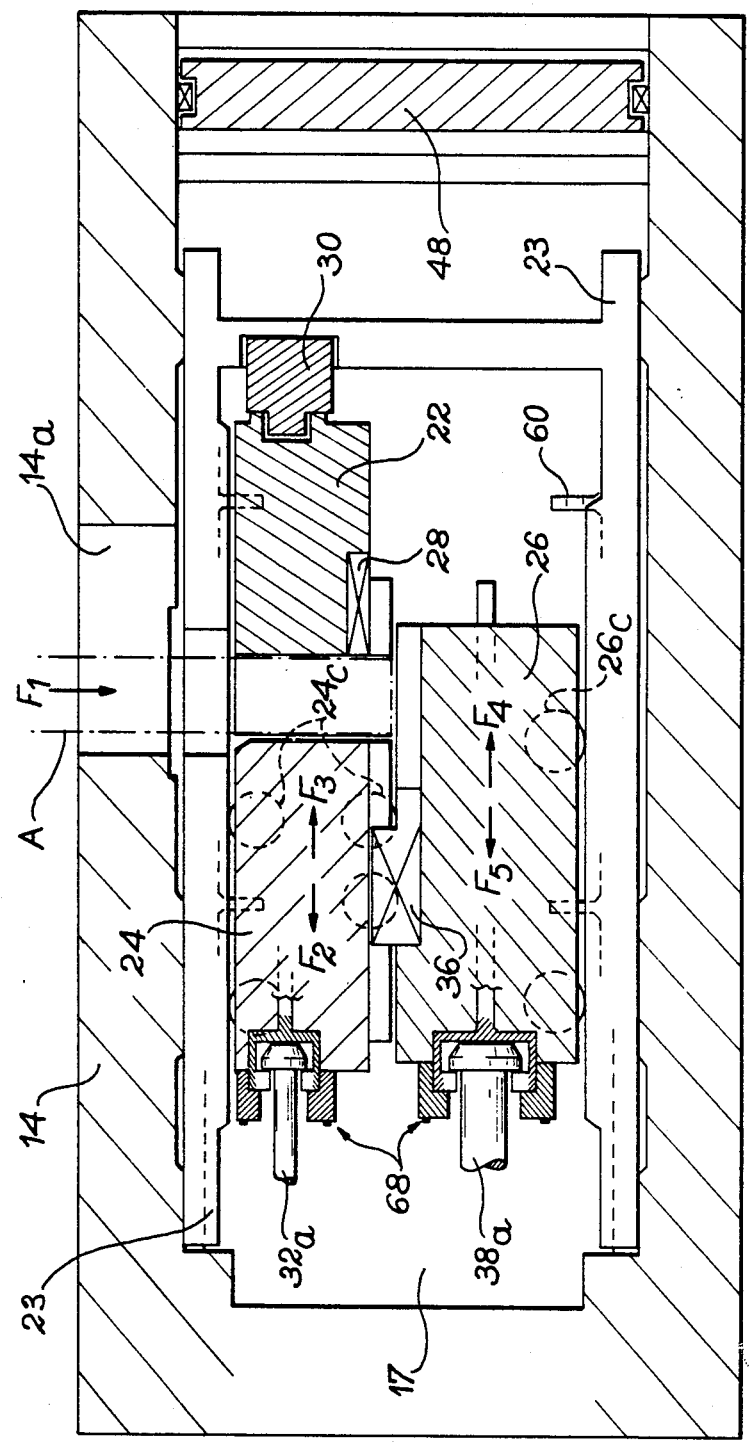
FIG. 3 a plan view, in section along line III—III of FIG. 2.

In per se known manner, the lateral partition of chassis 14 closest to the counterblade 28 and the side-clamping carriage 24 has a window 14a, through which the assemblies A enter passage 17 in a direction $F_1$ perpendicular to the direction defined by the latter (FIGS. 2 and 3).

When an assembly A is introduced into the shearing position, as is more particularly illustrated by FIG. 3, it projects beyond counterblade 28 and is flush with the blade holder carriage 26. Counterblade 28 is then placed on the side of the front face of the apparatus, i.e. on the side of partition 10a, relative to assembly A, whereas the side-clamping carriage 24 is placed on the side of the rear face of the apparatus with respect to said assembly.

In order to apply the assembly to be sheared against the counterblade 28, in order to hold it in place during shearing, the side-clamping carriage 24 is mounted so that it can move away from and towards counterblade 28 in the direction defined by passage 17 (arrows $F_2$ and $F_3$ in FIGS. 1 and 3). To this end, the carriage is placed on rails, in the manner to be described hereinafter, and it is connected by its rear face to the rod 32a of a double-acting jack 32. In order to facilitate interventions on jack 32, the latter is preferably located outside the confinement enclosure 10, behind rear partition 10b. Rod 32a then traverses partition 10b via a neutron protection means 34.

In order to ensure the shearing of the assemblies, the blade holder carriage 26 is mounted in such a way that it can move in passage 17, alongside counterblade 28 and the side-clamping carriage 24, in a direction parallel to the displacement direction of the latter (arrows $F_4$ and $F_5$ in FIGS. 1 and 3). To this end, carriage 26 is also placed on rails and is connected by its rear face to rod 38a (FIG. 3) of a not shown double-acting jack, which is preferably placed alongside jack 32, i.e. outside enclosure 10 and behind partition 10b.

According to the invention, counterblade 28 is also carried by a counterblade carriage 22, which is normally fixed and which bears against a detachable member 30, which vertically traverses passage 17 from the side of the front face of carriage 22. However, as will be shown hereinafter, carriage 22 can move in the direction defined by passage 17, when member 30 is removed. To this end, it is placed on rails, which also support the side-clamping carriage 24.

As is more particularly illustrated by FIGS. 1 and 2, said rails support carriages 22 and 24 and permit their displacement in the direction defined by passage 17. These rails are formed by parallel facing grooves 20a formed in cover 16 of chassis 14. Several pairs of horizontally axed rollers 22a are mounted on either side of the counterblade carriage 22, in the upper part thereof, and rest on the lower edges of grooves 20a, which consequently support carriage 22, whilst permitting its possible displacement in the direction defined by the passage. In a comparable manner, several pairs of horizontally axed rollers 24a are mounted on either side of the side-clamping carriage 24, in the upper part thereof, and rest on the lower edge of grooves 20a, which thus also ensure the supporting of carriage 24, whilst permitting its displacement during the operation of jack 32.

In order to ensure a correct lateral guidance of the side-clamping carriage 24 during its displacement, on cover 16 and just below grooves 20a, are provided two facing tread strips 21a in the form of substantially vertical planar surfaces on which roll the pairs of vertically axed rollers 24b placed on carriage 24 just below rollers 24a. Moreover, on a detachable part 23 on chassis 14, placed at the lower end of passage 17, is provided another tread strip 18a located in the same vertical plane as the closest tread 21a to the wall in which is formed window 14a. Another tread strip 26d, facing tread strip 18a is disposed in the same vertical plane as the other tread strip 21a is formed on the blade holder carriage 26. Pairs of vertically axed rollers 24c are also mounted on the lower part of carriage 24 and on either side thereof, in order to roll on treads 18a and 26d respectively.

A structure comparable to that described hereinbefore for supporting and laterally guiding carriage 24 is provided for carriage 26.

Thus, it can be seen in FIG. 2 that cover 16 also has, above carriage 26 and at the same level as rails 20a, two rails 20b constituted by two facing grooves parallel to grooves 20a and in which are received the pairs of vertically axed rollers 26a, mounted in the upper part of carriage 26 and on either side thereof.

Thus, just below grooves 20b, cover 16 defines planar, vertical tread strips 21b, against which bear the pairs of vertically axed rollers 26b, mounted on either side of carriage 26 and just below rollers 26a.

Finally, the detachable part 23 of chassis 14 has, level with tread 18a and facing the latter, a tread 18b against which bears vertically axed rollers 26c, mounted in the lower part of carriage 26, on the side opposite to tread 26d.

Bearing in mind that the counterblade carriage 22 is normally stationary during the operation of the shearing apparatus, it does not have any lateral guidance caster.

During the introduction or advance of assembly A following shearing (arrow $F_1$), the side-clamping carriage 24 is moved away from the counterblade carriage 22 also under the action of the double-acting jack 22 (arrow $F_2$). When the end of assembly A is flush with the blade holder carriage 26, in the manner illustrated in FIG. 3, the assembly is held in place by the side-clamping carriage 24 bearing against the counterblade carriage 22, under the action of jack 32 (arrow $F_3$). The blade holder carriage 26 then occupies the position shown in FIG. 3, where blade 36 is level with the side-clamping carriage 24. A portion of assembly A is then sheared by moving the blade holder carriage 26 in the direction of arrow $F_4$ in FIG. 3 under the action of the not shown jack, whose rod is designated in the drawings by reference numeral 30a. The sheared portion then drops by gravity into a hopper or chute 40, integral with the detachable part 23 of chassis 14. Hopper 40 is surrounded by a second hopper or chute 42, fixed to the bottom of chassis 14.

According to the invention, it is possible to dismantle carriages 22, 24 and 26 without removing cover 16. For this purpose, it has already been shown that carriage 22, in the same way as carriages 24 and 26, is provided with casters enabling it to move along rails 20a and 20b. For the same reason, it has also been stated that carriage 22 bears against a detachable member 30.

In order to complete these characteristics and make it possible to carry out the desired operational interventions on carriages 22, 24 and 26, which carry the main worn parts constituted by the blade and counterblade, according to the invention, with the shearing cell 12 is juxtaposed an intervention cell 44, which communicates with cell 12 by a passage 46, made in the front partition 10a of confinement enclosure 10. Passage 46 is located in the extension of the paths of carriages 22, 24 and 26 defined by rails 20a and 20b and it has an adequate size to permit the passage of said carriages into the intervention cell 44. In operation, passage 46 is normally tightly closed by a cover 48, positioned e.g. within cell 12. In order to guide and support the carriages, when an operational intervention makes it pecessary to move them from cell 12 into cell 44 and then return them to cell 12, it can be seen in FIG. 1 that the supporting rails 20a, 20b, as well as the tread strips 21a, 21b formed in cover 16, are extended on either side of cover 48, within passage 46 and in intervention cell 44, in the form of rails 50 and tread strips 51 respectively.

As a result of these features, it is clear that it is easy to act on any of the carriages 22, 24 and 26, by bringing it into the intervention cell 44, as is shown for carriage 26 in FIG. 1. For this purpose, it is merely necessary to retract or remove member 30, against which normally bears the counterblade carriage 22 and cover 48, normally ensuring the necessary sealing between cells 12 and 44. To this end, it can be gathered from FIG. 1 that member 30 can move vertically upwards (arrow $F_6$) under the action of a control mechanism, such as a jack 52. In a comparable manner, cover 48 can also move vertically upwards (arrow $F_7$) under the action of a control mechanism, such as a jack 54. Obviously, the travels of member 30 and cover 48 are adequate to enable the carriages to pass freely from cell 12 to cell 44 and vice versa.

According to the invention, the features described hereinbefore make it possible to significantly reduce the intervention time compared with the prior art shearing means, whilst preventing any dispersion of the contamination above cover 16 of chassis 14.

In certain extreme cases corresponding e.g. to guide rails 20a, 20b, treads 18a, 18b, 21a, 21b or chute 40 becoming worn, it is necessary to dismantle parts of the shearing apparatus which do not fall into the category of parts normally subject to wear. Therefore, and as illustrated in FIG. 2, guide rails 20a, 20b and treads 21a, 21b are formed directly on cover 16, and the latter can be removed from chassis 14 by acting on the known assembly clips of clamps 56, provided for this purpose. In this type of exceptional intervention, cover 16 and the carriages which it supports are disengaged upwards into the shearing cell 12. Where necessary, it is then possible to extract the member 23 carrying treads 18a, 18b and chute 40 through the opening which is then left free in chassis 14.

Bearing in mind the special conditions of the intervention, it is clear that the different operations described hereinbefore are performed remotely, e.g. by means of manipulators. To this end, the different members which have to be manipulated are provided with handling and lifting hooks such as 58 for the clamps 56, such as 60 for member 23, or such as 62 for the box of jack 54.

When carriages 22, 24 and 26 have to be brought into the intervention cell 44, it is also necessary to remotely disconnect them from the rods of jacks 32a and 38a and to draw them towards cell 44. For this purpose, remotely dismantable connection means, such as bayonet joint means 68 can be provided between the jack rods and the carriages. As illustrated in FIG. 1, the locking and unlocking of these joint means can be controlled with the aid of a rotary rod, such as 64 for carriage 26. This rod issues into the front face of the carriage and at this level is provided with a hook 66, permitting its remote manipulation.

Obviously, the apparatus according to the invention can be used for shearing assemblies having different sections and it is obvious that the window 14a consequently has an adequate size to permit the passage of assemblies having a larger section. For the same reason, counterblade carriage 22 carries regulatable guidance members 70, whilst the side-clamping carriage 24 carries regulatable bearing members 72.

What is claimed is:

1. An apparatus for shearing irradiated fuel assemblies, comprising a confinement cell, provided with a supporting member for supporting at least one fixed counterblade, at least one side-clamping carriage adapted to engage an assembly to be sheared by the counterblade and at least one blade holder carriage adapted to move in a direction perpendicular to said counterblade in order to shear said assembly, the counterblade being mounted on a counterblade carriage which normally bears against a detachable member, the counterblade carriage, the side-clamping carriage and the blade holder carriage being arranged on rails disposed in a direction perpendicular to the counterblade, an intervention cell, said confinement cell communicating with said intervention cell by a passage normally sealed by a cover, said rails being extendable into said intervention cell within said passage, the dimensions of said passage being sufficient to permit the carriages to travel in said intervention cell when said detachable member and said cover are removed.

2. An apparatus according to claim 1, wherein the upper portion of said supporting member is provided with a detachable cover enclosing said confinement cell and at least part of said rails.

3. An apparatus according to claim 2, wherein the lower portion of said supporting member is provided with means for detachment after removal of said cover, said detachable means in turn being provided with lateral guide means to facilitate lateral guidance of said side-clamping carriage and said blade holder carriage.

4. An apparatus according to claim 3, wherein a hopper is provided to receive sheared portions of said fuel assemblies.

* * * * *